(12) United States Patent
Kwon et al.

(10) Patent No.: US 12,539,725 B1
(45) Date of Patent: Feb. 3, 2026

(54) DRIVING MODULE FOR VEHICLE

(71) Applicants: Hyundai Motor Company, Seoul (KR); Kia Corporation, Seoul (KR)

(72) Inventors: Hyukjoon Kwon, Hwaseong-si (KR); Hyeon Seok Cho, Hwaseong-si (KR); Taeg Ki Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/258,500

(22) Filed: Jul. 2, 2025

(30) Foreign Application Priority Data

Dec. 11, 2024 (KR) .................. 10-2024-0183246

(51) Int. Cl.
*B60G 3/01* (2006.01)
*B60G 3/18* (2006.01)
(Continued)

(52) U.S. Cl.
CPC ............. *B60G 3/207* (2013.01); *B60G 3/185* (2013.01); *B60G 7/001* (2013.01); *B60G 7/008* (2013.01); *B60K 7/0007* (2013.01); *B62D 7/10* (2013.01); *B62D 7/18* (2013.01); *B60G 2200/13* (2013.01); *B60G 2204/129* (2013.01);
(Continued)

(58) Field of Classification Search
CPC ........ B60G 3/01; B60G 15/062; B60G 7/008; B60G 2204/4232; B60G 2204/4104; B60G 2204/45; B60G 2204/148; B60G 2204/421; B60G 2206/50; B60G 2204/30; B60G 3/207; B60G 3/185; B60G 7/001; B60G 2200/13; B60G 2204/129; B60G 2204/4306; B60K 7/0007; B60K 2007/0038; B60K 2007/0092; B62D 7/10; B62D 7/18; B62D 3/04
See application file for complete search history.

(56) References Cited

U.S. PATENT DOCUMENTS

| | | | |
|---|---|---|---|
| 6,113,119 A * | 9/2000 | Laurent | B60G 17/0157 280/124.1 |
| 7,537,071 B2 * | 5/2009 | Kamiya | B60K 17/043 180/57 |

(Continued)

FOREIGN PATENT DOCUMENTS

KR     20130012827 A     2/2013

OTHER PUBLICATIONS

Protean, https://www.proteanelectric.com/technology, retrieved Jul. 2, 2025, 8 pages.
(Continued)

*Primary Examiner* — Toan C To
(74) *Attorney, Agent, or Firm* — Slater Matsil, LLP

(57) ABSTRACT

A vehicle driving system including a driving/braking system including an in-wheel motor and an electromechanical brake installed in an inner side of a rim of a tire, a suspension system coupled to a rotational center shaft of the rim, and a steering system provided on an upper portion of the suspension system, wherein the suspension system includes a knuckle connected to the rotational center shaft of the rim, a plurality of first links each having one end connected to the knuckle, second links respectively connected to the other ends of the first links and the steering system, and a damper unit located between the knuckle and the steering system.

16 Claims, 9 Drawing Sheets

(51) Int. Cl.
 *B60G 3/20* (2006.01)
 *B60G 7/00* (2006.01)
 *B60K 7/00* (2006.01)
 *B62D 7/10* (2006.01)
 *B62D 7/18* (2006.01)
 *B62D 3/04* (2006.01)

(52) U.S. Cl.
 CPC ........... *B60G 2204/148* (2013.01); *B60G 2204/4306* (2013.01); *B60G 2204/45* (2013.01); *B60K 2007/0038* (2013.01); *B60K 2007/0092* (2013.01); *B62D 3/04* (2013.01)

(56) References Cited

U.S. PATENT DOCUMENTS

| | | | | |
|---|---|---|---|---|
| 8,037,957 B2* | 10/2011 | Laurent | ................ | B60K 17/043 |
| | | | | 180/65.6 |
| 8,453,774 B2* | 6/2013 | Nagaya | ................ | B60K 17/30 |
| | | | | 180/65.6 |
| 8,746,383 B2* | 6/2014 | Basadzishvili | .......... | B60G 3/01 |
| | | | | 280/124.1 |
| 9,731,572 B2* | 8/2017 | Tamura | ................ | B60G 15/062 |
| 10,131,218 B2* | 11/2018 | Dolgov | .................... | B60K 7/00 |
| 10,414,264 B2* | 9/2019 | Tamura | ................ | B60B 27/00 |
| 11,524,538 B2* | 12/2022 | Sardes | .................... | B60G 3/207 |
| 11,535,075 B2* | 12/2022 | Park | .......................... | B60G 3/20 |
| 2008/0185807 A1* | 8/2008 | Takenaka | ................ | B60G 3/14 |
| | | | | 280/124.153 |
| 2008/0203693 A1* | 8/2008 | Yamada | ................ | B60G 3/01 |
| | | | | 280/124.127 |
| 2011/0209938 A1* | 9/2011 | Basadzishvili | ...... | B60K 7/0007 |
| | | | | 180/305 |
| 2017/0058975 A1* | 3/2017 | Szewczyk | ................ | F16D 65/12 |
| 2019/0263215 A1* | 8/2019 | Shibuya | ................ | B60K 7/0007 |
| 2021/0245561 A1* | 8/2021 | Sardes | .................... | B60G 3/207 |
| 2025/0074525 A1* | 3/2025 | Dekel | .................... | B60W 10/22 |
| 2025/0196615 A1* | 6/2025 | Kwon | ...................... | B60G 3/01 |

OTHER PUBLICATIONS

Schaeffler Group, https://www.schaeffler.com/en/media/dates-events/kolloquium/digital-conference-book-2022/rolling-chassis, retrieved Jul. 2, 2025, 16 pages.

* cited by examiner

A-A

DRIVING MODULE FOR VEHICLE

CROSS-REFERENCE TO RELATED APPLICATIONS

This application claims, under 35 U.S.C. § 119 (a), the benefit of priority from Korean Patent Application No. 10-2024-0183246, filed on Dec. 11, 2024, the entire contents of which are incorporated herein by reference.

TECHNICAL FIELD

The present disclosure relates to a vehicle driving module.

BACKGROUND

Recently, research and development has been actively conducted on various types of driving modules to be applied to future vehicles. Protean 360+ serving as a vehicle driving module may be an independent driving module having a one-point mount design to implement a steering angle of 90° or higher.

Although the Protean 360+ driving module implements a large steering angle of 90° or higher by utilizing a steering motor disposed on an upper portion thereof, durability thereof may deteriorate due to one-point mount design of the upper portion.

Particularly, the Protean 360+ driving module may omit connecting parts such as a lower control arm and a tie rod, and may independently drive and steer each wheel in the vehicle such that the turning radius is significantly reduced when the vehicle turns.

In addition, the Protean 360+ driving module may have a steering angle of ±180°, and the Mobis e-Corner driving module may have a steering angle of ±90°.

Further, the Schaeffler Corner Module is a driving module configured to have a four-point mount design for driving stability. The Schaeffler Corner Module may include parts such as a lower control arm and a tie rod and may have a steering angle of −90° to +45°.

Particularly, the Schaeffler Corner Module may be advantageous in durability and driving stability as compared with a driving module having a one-point mount design. The Schaeffler Corner Module has a limitation in providing only a steering angle of less than 90° due to a mechanical link coupling structure thereof.

Therefore, there is a demand for a driving module capable of providing driving stability and a large steering angle.

The above information disclosed in this Background section is only for enhancement of understanding of the background of the disclosure, and therefore it may contain information that does not form the prior art that is publicly known, available, or in use.

Korean Patent Laid-Open Publication No. 2013-0012827 recites subject matter that is related to subject matter discussed herein.

SUMMARY

The present disclosure relates to a vehicle driving module, and more particularly, to a vehicle driving module configured to secure high stability against external force in the horizontal direction of the vehicle as well as external force in the height direction of the vehicle, and to integrate a driving/braking system, a steering system, and a suspension system with each other to enable large-angle steering.

An embodiment of the present disclosure can solve the above-described problems associated with the prior art, and can provide a driving module capable of providing high stability against horizontal external force through a suspension device including a link coupling structure.

An embodiment of the present disclosure can provide a driving module including a link and a damper unit that are integrally coupled to a knuckle, thereby achieving high stability when a vehicle bumps or rebounds.

Advantages of embodiments of the present disclosure are not necessarily limited to the above-mentioned advantages, and other technical advantages not mentioned herein can be understood by those skilled in the art to which the present disclosure pertains from the detailed description of the example embodiments. Advantages of embodiments of the present disclosure may be achieved by systems, components, and combinations thereof as indicated in the claims.

In an embodiment of the present disclosure, a vehicle driving module can include a driving/braking system including an in-wheel motor and an electromechanical brake (EMB-based brake) installed in an inner side of a rim of a tire, a suspension system coupled to a rotational center shaft of the rim, and a steering system provided on an upper portion of the suspension system, wherein the suspension system includes a knuckle connected to the rotational center shaft of the rim, a plurality of first links each having one end connected to the knuckle, second links respectively connected to the other ends of the first links and the steering system, and a damper unit located between the knuckle and the steering system.

In an embodiment, the steering system may include a first steering member configured to be fixed to a vehicle body, and a second steering member located on an inner side of the first steering member, the second steering member having a lower portion connected to the suspension system.

In an embodiment, each of the second links may contact the second steering member when a vehicle bumps and functions as a stopper.

In an embodiment, the damper unit may have one end connected to the knuckle and the other end connected to the second steering member.

In an embodiment, the one end of the damper unit connected to the knuckle may be connected to a lower end of the knuckle, the lower end being located below the rotational center shaft.

In an embodiment, the first links may be symmetrically connected to a left end and a right end of the knuckle.

In an embodiment, the vehicle driving module may further include transmission links each configured to connect the other ends of the first links respectively connected to the left end and the right end of the knuckle.

In an embodiment, the transmission links respectively located at the left end and the right end of the knuckle may be provided parallel to each other.

In an embodiment, each of the first links may have one end connected to a lowermost end of a corresponding one of the left end and the right end of the knuckle, and each of the first links may have the other end connected to a corresponding one of the transmission links and a corresponding one of the second links.

In an embodiment, a distance between lower ends of the second links respectively located on a left side and a right side of the knuckle may vary when a vehicle bumps or rebounds.

In an embodiment, each of the first links, each of the second links, and each of the transmission links may be connected to each other using a corresponding one of revolute joints.

In an embodiment, each of the second links may have a space configured for a corresponding one of the transmission links to be located therein.

In an embodiment, each of the first links may have the one end connected to the knuckle and configured to be movable in a height direction when a vehicle bumps or rebounds.

In an embodiment, the rotational center shaft may protrude from an outer surface of the rim so as to be inserted into an insertion groove formed in the knuckle.

In an embodiment, the steering system may further include a steering driving unit configured to rotatably drive the second steering member.

In an embodiment, the second steering member and the steering driving unit may be coupled to each other through a worm wheel structure.

The terms "vehicle", "vehicular", and other similar terms as used herein can be inclusive of motor vehicles in general, such as passenger automobiles including sport utility vehicles (SUVs), buses, trucks, various commercial vehicles, watercraft including a variety of boats and ships, aircraft, tractors, forklifts, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle can be a vehicle that has two or more sources of power, for example, vehicles powered by both gasoline and electricity.

BRIEF DESCRIPTION OF THE DRAWINGS

The above and other features of example embodiments of the present disclosure will now be described in detail with reference to the accompanying drawings, which are given hereinbelow by way of illustration, and thus are not necessarily limitative of the present disclosure, and wherein.

Figure 1:
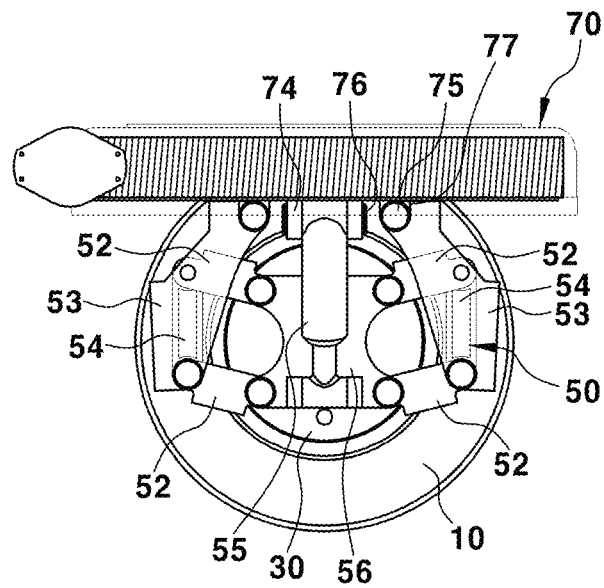
FIG. 1 is a side view of a vehicle driving module according to an embodiment of the present disclosure.

It can be understood that the appended drawings are not necessarily to scale, presenting a somewhat simplified representation of various features illustrative of some basic principles of example embodiments of the present disclosure. The specific design features of an embodiment of the present disclosure as disclosed herein, including, for example, specific dimensions, orientations, locations, and shapes can be determined in part by a particular intended application and use environment.

In the figures, reference numbers can refer to same or equivalent parts of some embodiments of the present disclosure throughout the several figures of the drawing.

DETAILED DESCRIPTION OF ILLUSTRATIVE EMBODIMENTS

Hereinafter, reference will be made in detail to various example embodiments of the present disclosure, which are illustrated in the accompanying drawings and described below. While the present disclosure will be described in conjunction with example embodiments, it can be understood that the present description is not intended to necessarily limit the present disclosure to the example embodiments. On the contrary, the present disclosure is intended to cover not only the example embodiments, but also various alternatives, modifications, equivalents, and other embodiments, which may be included within the spirit and scopes of the present disclosure as defined by the appended claims.

As used herein, the suffixes "module" and "part" can be used only for differentiation between components, and are not to be necessarily construed as implying that the components are separated or otherwise capable of being separated physically and chemically.

Terms such as "first" and/or "second" may be used herein to describe various elements in the present disclosure, but these elements are not to be necessarily construed as being limited by such terms. Such terms can be used only for the purpose of differentiating one element from other elements in the present disclosure. The sequential meaning of such terms can be determined not necessarily by names of the terms and through the context of descriptions thereof.

The term "and/or" can be used to include any combination of multiple items in question. For example, "A and/or B" can include all three cases, i.e., "A", "B", and "A and B".

When one component is referred to as being "connected" or "joined" to another component, the one component may be directly connected or joined to the other component, and it can be understood that other components may be present therebetween.

Same reference numerals can represent same components throughout the specification. Terms in the specification can be used merely to describe example embodiments and are not intended to necessarily limit the present disclosure. In this specification, an expression in a singular form also can include a plural form, unless clearly specified otherwise in context. It can be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Terms used herein, including technical and scientific terms, can have same meanings as those commonly understood by those skilled in the art. Terms such as those defined in commonly used dictionaries can be interpreted as having meanings that are consistent with their meanings in the context of the relevant art and the present disclosure.

Next, each component of an example embodiment of the present disclosure will be described in detail with reference to the accompanying drawings.

Figure 2:
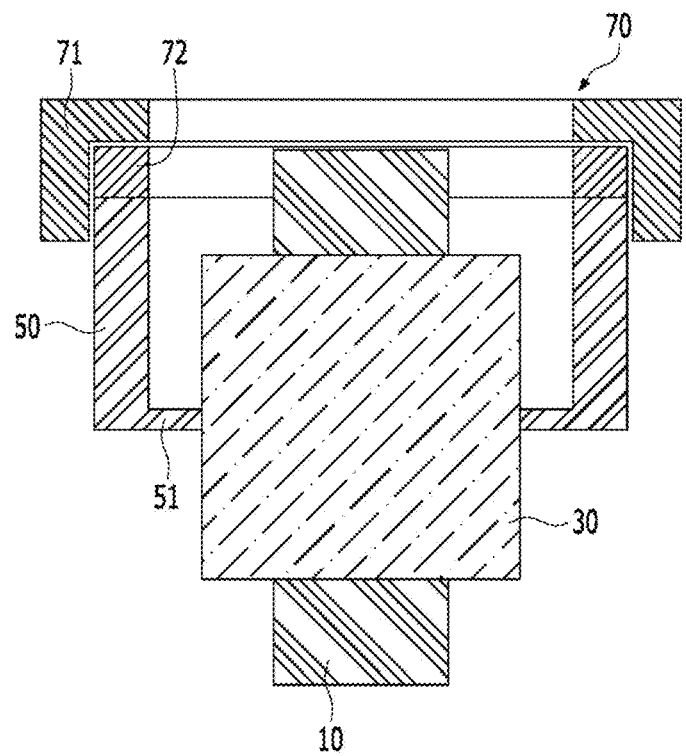
FIG. 2 is a front view of a vehicle driving module according to an embodiment of the present disclosure.

A vehicle driving module according to an embodiment of the present disclosure may be configured to include a driving/braking system 30, a suspension system 50, and a steering system 70, as shown in FIGS. 1 and 2.

Figure 3:
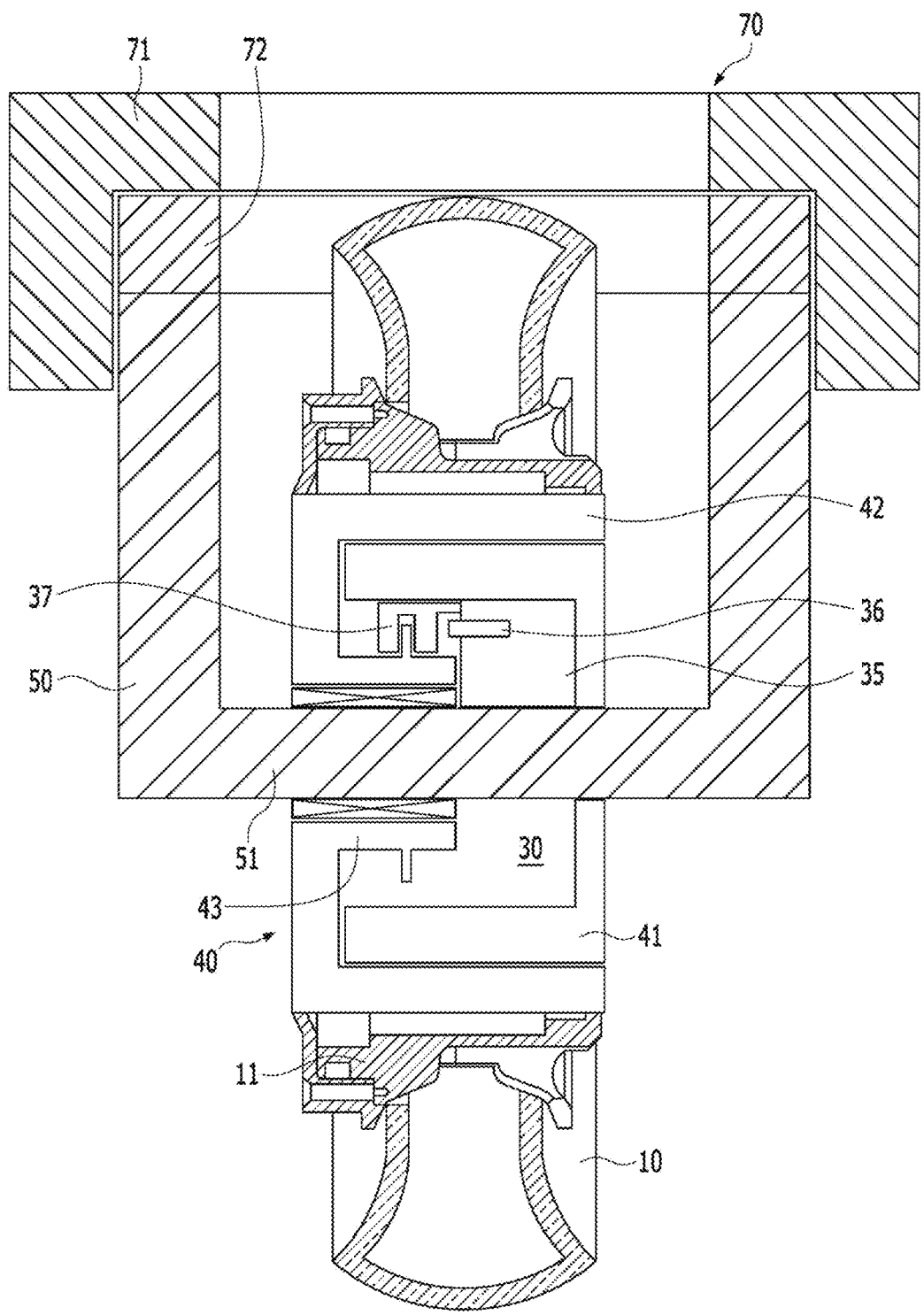
FIG. 3 is a configuration diagram including some cross-section views and showing a driving/braking system of a vehicle driving module according to an embodiment of the present disclosure.

As shown in FIG. 3, the driving/braking system 30 may be configured to be implemented by an in-wheel motor 40 and an electromechanical brake (EMB) 35 installed in the inner space of a rim 11 of a tire 10.

The rim 11 of the tire 10 is a circular rigid member including a wheel, and the tire 10 is coupled to the rim 11 in a state of surrounding the outer wheel of the rim 11. Further, the rim 11 may include a hollow portion having a set, selected, or predetermined size capable of accommodating the in-wheel motor 40 and the electromechanical brake (EMB) 35.

The suspension system 50 may be located on at least one of the left and right sides of the driving/braking system 30, and a suspension support shaft 51 may be fixedly installed to form a rotational center shaft of the rim 11. A spring or a fluid damper element may be utilized as a damper units 55.

Figure 4:
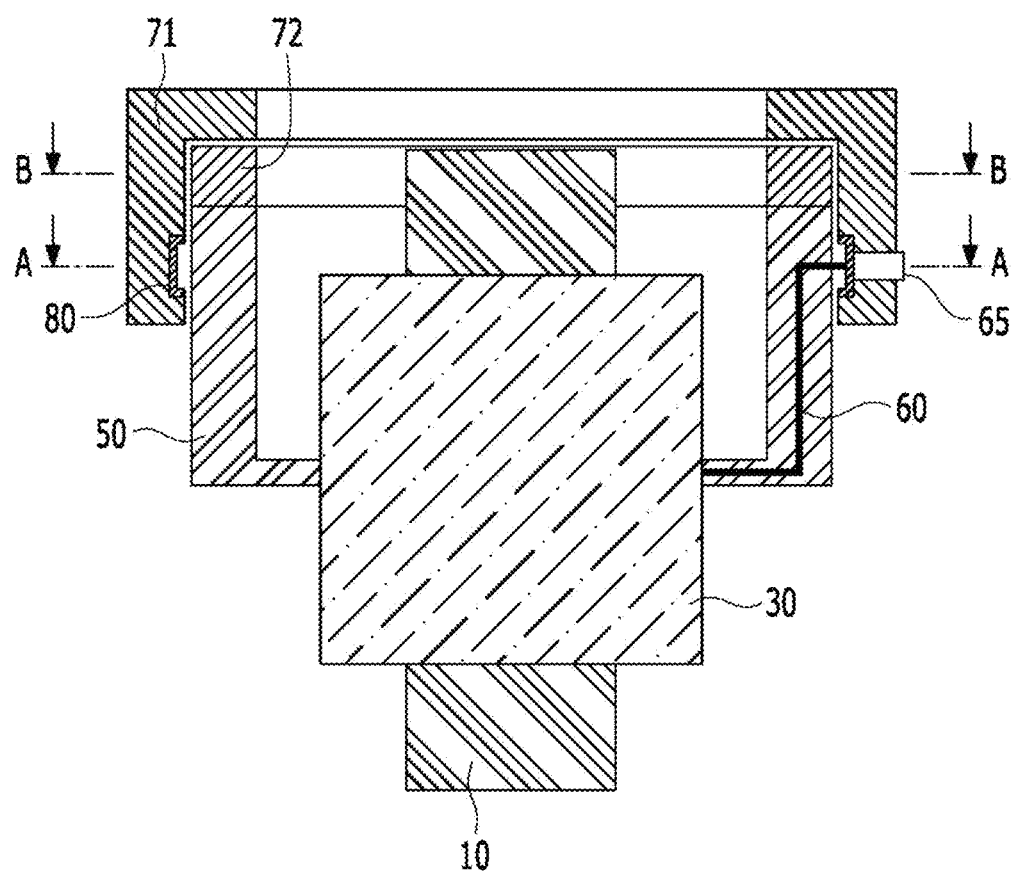
FIG. 4 is a configuration diagram showing a steering system and a power supply structure of a vehicle driving module according to an embodiment of the present disclosure.
Figure 5:
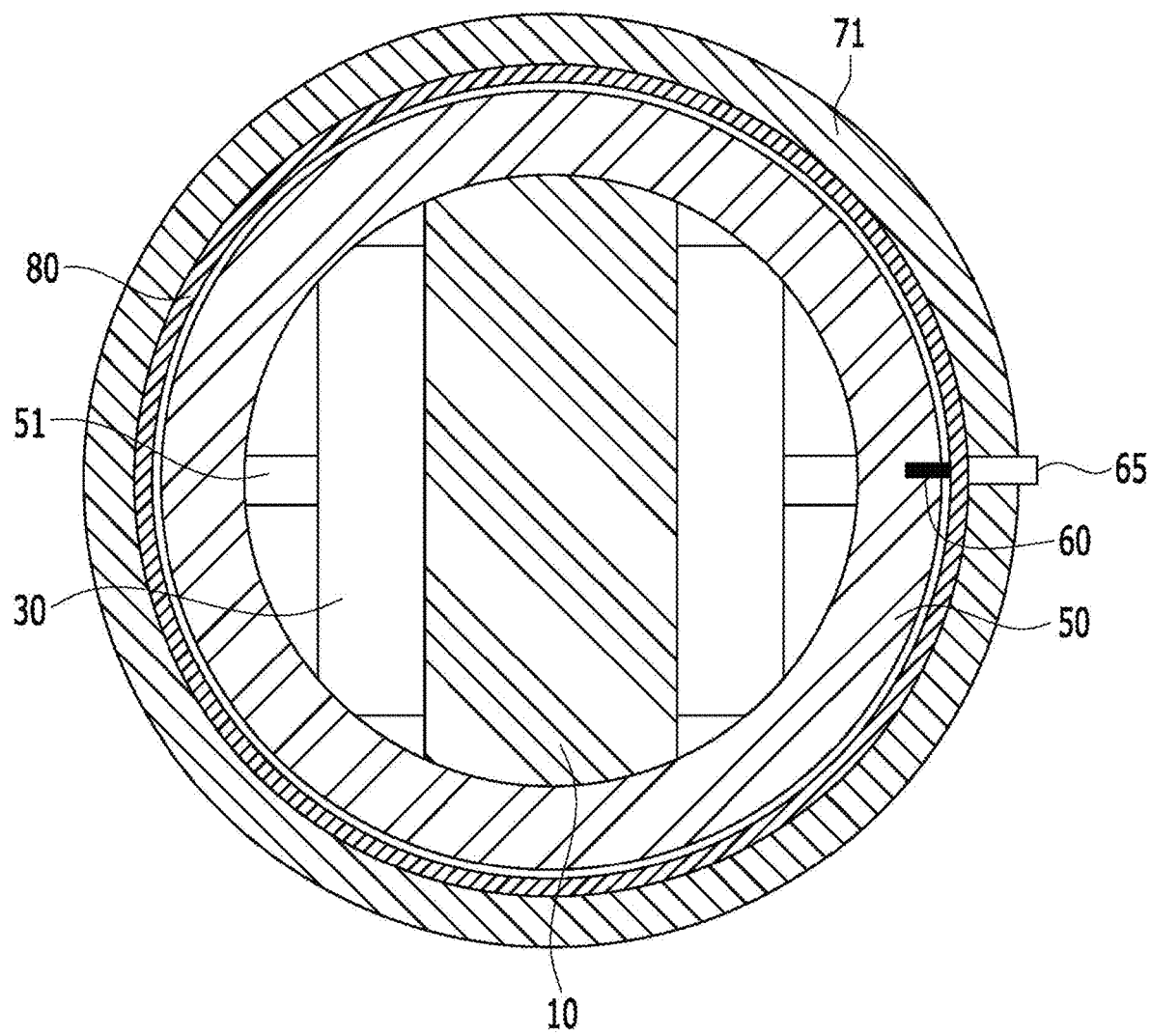
FIG. 5 is a cross-sectional view taken along line A-A in FIG. 4.
Figure 6:
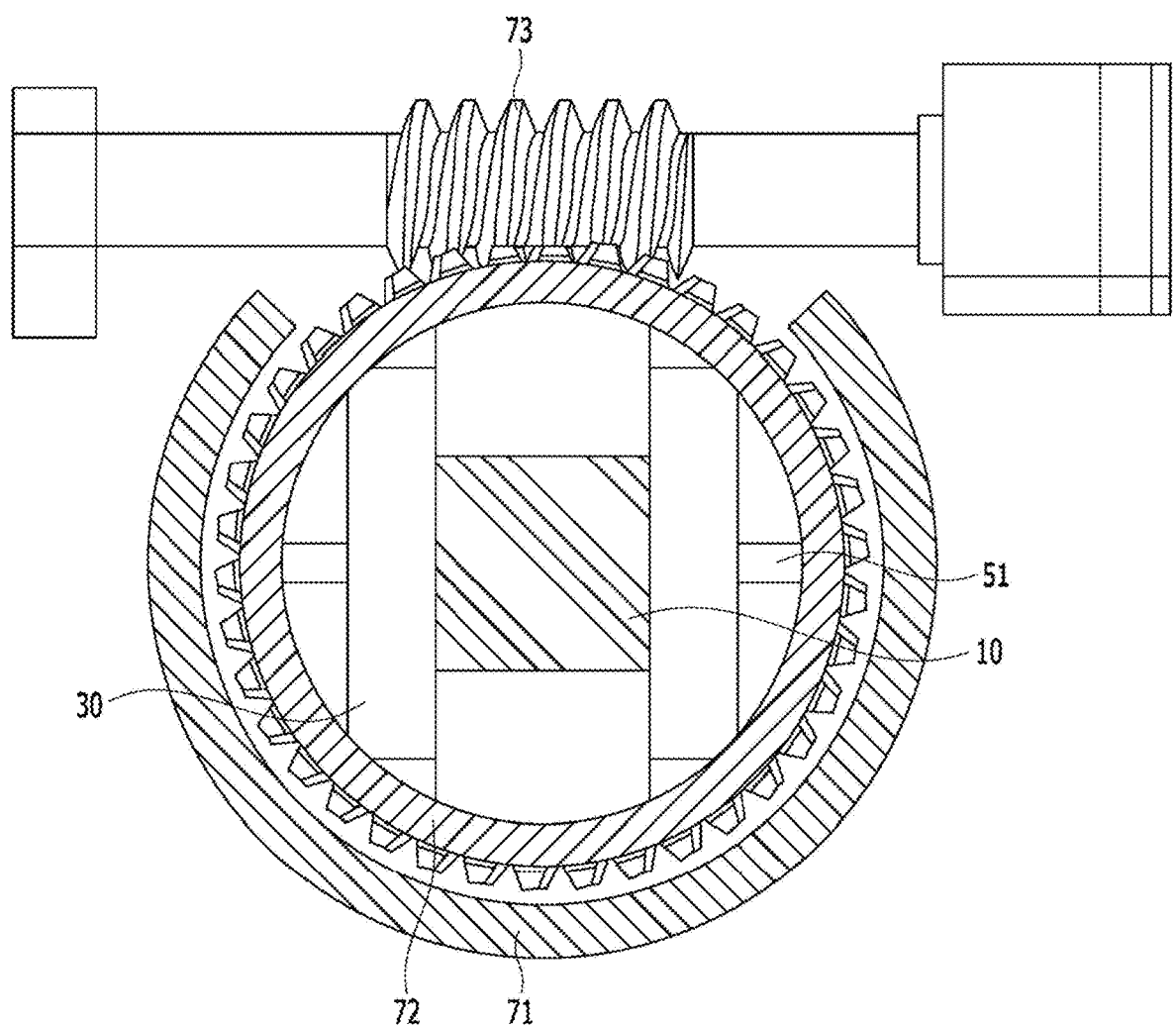
FIG. 6 is a cross-sectional view taken along line B-B in FIG. 4.

As shown in FIGS. 4 to 6, the steering system 70 may include a disc-shaped first steering member 71 located on the upper side of the suspension system 50 and attached to the lower portion of a vehicle body, a second steering member 72 located on the inner side of the first steering member and attached to the upper portion of the suspension system 50, and a steering driving unit 73 configured to drive rotation of the second steering member 72. In this manner, the packaging space formed on the upper portion of the tire 10 may be minimized, thereby implementing a full flat shape.

Hereinafter, a detailed description will be given as to the driving/braking system 30, the suspension system 50, and the steering system 70 included in the vehicle driving module according to an embodiment of the present disclosure.

Driving/Braking System

The driving/braking system 30 may be configured to be implemented by utilizing the in-wheel motor 40 and the EMB-based disc brake 35, as shown in FIG. 3.

In this example, the in-wheel motor 40 can be a motor installed in the inner space of the rim 11 of the tire 10 and configured to directly transmit power to the rim, and an internal or external motor may be used as the in-wheel motor.

In particular, as shown in FIG. 3, when power is applied to a stator 41 including stator windings (not shown) made of a conductive material, the in-wheel motor 40 of the driving/braking system 30 can be configured to rotate a disc 43 in a state in which a rotor 42 serving as a permanent magnet rotates the rim 11.

Particularly, the suspension support shaft 51 of the suspension system 50 may be configured to form the rotational center shaft of the rim 11, and the rotor 42 may be configured to rotate the rim 11 and the disc 43 around the suspension support shaft 51. Furthermore, the suspension support shaft 51 can include a protrusion protruding from opposite ends of the outer surface of the rim 11, and the protrusion may be inserted into an insertion groove 57 formed in a knuckle 56. The protrusion may be configured to have a set, selected, or predetermined shape so as to be inserted into and fixed in the insertion groove 57 of the knuckle 56. In this manner, the rim 11 may be rotated around the knuckle 56.

The driving/braking system 30 may utilize the EMB-based brake 35 configured to electronically brake the rotating disc 43 with a brake pad 37 driven by an actuator 36. The electromechanical brake (EMB) may be configured to electronically control the operation of a brake.

In this example, the EMB-based brake 35 according to an embodiment of the present disclosure may be configured to eliminate a hydraulic line that may limit the steering angle by being converted into a mechanical type that does not necessarily require a hydraulic line of a hydraulic brake.

The electromechanical brake may control braking force more precisely than a hydraulic brake and may be automatically operated when an autonomous driving system is applied, thereby increasing user convenience and improving vehicle technology.

Particularly, an embodiment of the present disclosure may use a braking system utilizing an EMB-based disc or drum. In an electromechanical drum brake, rotational torque can be additionally generated by self-servo action causing a brake shoe pressed by a drum to be rotated with the drum, thereby increasing braking force (braking torque).

Steering System

The steering system 70 may include the first steering member 71 and the second steering member 72, as shown in FIG. 4. The first steering member 71, which may be formed in a roughly disc shape, may be fixedly coupled to the lower portion of the vehicle body, and the second steering member 72, which may be formed in a ring shape, may be built into the first steering member 71 and may be coupled to the upper portion of the suspension system 50.

The steering system 70 can have a structure in which the first steering member 71 having a roughly circular shape and the second steering member 72 having a ring shape can be stacked in the vertical direction. In this manner, the packaging space formed between the tire 10 and the lower vehicle body may be maximally reduced, thereby making it possible not only to implement a full-flat shape, but also to improve durability through multiple mounting points on the vehicle body.

In detail, as shown in FIG. 6, the steering system 70 may include the disc-shaped first steering member 71 located on the upper side of the suspension system 50 and attached to the lower portion of the vehicle body, the second steering member 72 located on the inner side of the first steering member and configured for the upper portion of the suspension system 50 to be attached to the lower portion thereof, and the steering driving unit 73 configured to drive rotation of the second steering member 72.

In this example, the second steering member 72 and the steering driving unit 73 may have gear structures so as to be engaged with each other. If the steering driving unit is a worm gear, the second steering member may be a worm wheel, and the steering driving unit may be rotated by a driving motor.

Therefore, when the steering driving unit 73 is driven, the second steering member 72 is rotated, and the suspension system 50 is rotated by a steering angle to change the direction of the tire 10.

Power Supply Structure

In the vehicle driving module, the driving/braking system 30 may be installed in the rim 11 of the tire 10, and the steering angle of the tire controlled by the steering system 70 may be limited by a power supply structure configured to supply power to the driving/braking system 30.

As shown in FIG. 4, the power supply structure of the vehicle driving module may be configured such that a ring-type power connection unit 80 may be fixedly provided on the inner surface of the first steering member 71 of the steering system 70, and a first power supply part 65 may be provided on one side of the first steering member 71.

In this example, the power connection unit 80 may be configured such that the first power supply part 65 is electrically connected to one side of the ring-shaped outer surface of the power connection unit, and the first power supply part may be configured to receive external power.

A second power supply part 60 can be built into one side of the suspension system 50, and the upper portion of the second power supply part 60 may be electrically connected along the inner surface of the ring of the power connection unit 80.

The lower portion of the second power supply part 60 may be electrically connected to the in-wheel motor 40 and the EMB-based disc brake 35.

In detail, in the power supply structure of the vehicle driving module, when the suspension system 50 is rotated by the steering angle with the second steering member 72 of the steering system 70, the second power supply part 60 may be configured to supply power to the in-wheel motor 40 and the EMB-based disc brake 35 while rotating along the inner circumferential surface of the ring of the power connection unit 80 in a state in which the upper end of the second power supply part is electrically connected to the inner circumferential surface of the ring of the power connection unit 80 in a fixed state.

The power supply structure of the vehicle driving module may include the second power supply part 60, the first power supply part 65, and the power connection unit 80. When the steering angle of the tire 10 is controlled by the steering system 70, the steering angle is not necessarily limited by a power supply structure and the like, thereby making it possible to readily implement a steering angle without limitation.

Suspension System

Figure 7:
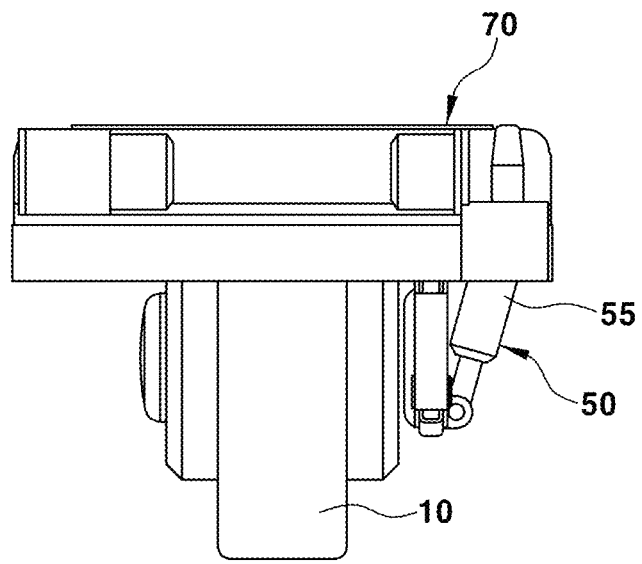
FIG. 7 is a front view of a suspension system according to an embodiment of the present disclosure.
Figure 8:
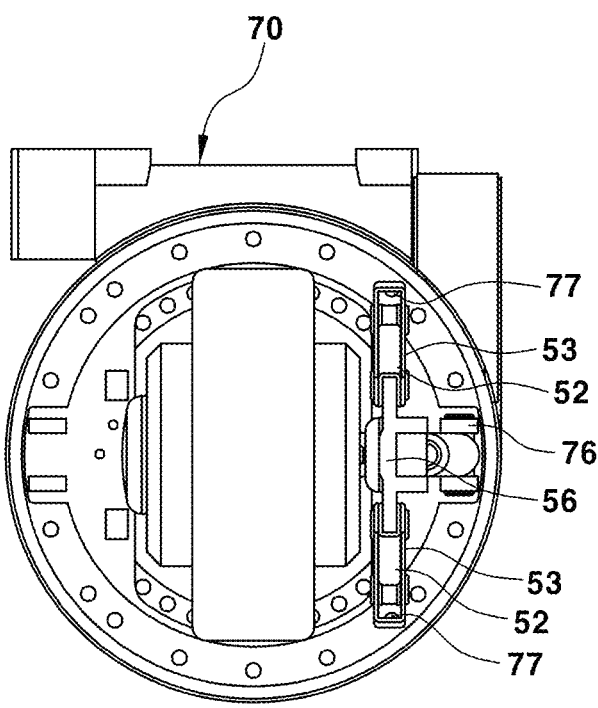
FIG. 8 is a bottom view of a suspension system according to an embodiment of the present disclosure.

As shown in FIG. 1 and FIGS. 7 and 8, the suspension system 50 may be configured to support the vehicle body by utilizing a plurality of links and a damper unit 55 in a state of being located on at least one of the left and right sides of the tire 10. The knuckle 56 may be coupled to the suspension support shaft 51 located on the rotational center shaft of the tire 10, and the outer surface of the knuckle 56 may be surrounded by utilizing a first link 52 and a second link 53. Furthermore, the damper unit 55 may be located on the knuckle 56. One end of the damper unit 55 may be located at the lower end of the knuckle 56 (e.g., below the rotational center shaft), and the other end thereof may be located on the steering system 70.

The first link 52 can have one end located at the knuckle 56. The first link 52 can include two links located on both sides of the knuckle 56. The two links constituting the first link 52 may be located parallel to each other along both sides of the knuckle 56. The second link 53 can be connected to at least one of the two links. The suspension system 50 can further include a transmission link 54 configured to connect the ends of the two links adjacent to the second link 53. The second link 53, the first link 52, and the transmission link 54 may be jointly coupled to one connection point.

In an embodiment of the present disclosure, the first link 52 which can be formed of two links can be jointly coupled to the knuckle 56. One of the two links forming the first link 52, which can extend along the lower side of the knuckle 56, can be jointly coupled to the second link 53 and the transmission link 54, and the other one thereof, which can extend along the upper side of the knuckle 56, can be coupled to the other end of the transmission link 54.

The first link 52, the second link 53, and the transmission link 54 which can be jointly connected to each other can be configured to have a rotational degree of freedom with respect to a joint serving as a coupling point. The first link 52 may be moved around the knuckle 56 in the height direction of the vehicle, and the second link 53 may be moved in a direction toward or away from the knuckle 56 in conjunction with movement of the first links 52.

In this manner, the knuckle 56, the first link 52, the transmission link 54, and the second link 53 can be connected to each other, and the respective links can be jointly coupled to each other. The knuckle 56, the first link 52, the transmission link 54, and the second link 53 may be rotatably connected to each other with respect to a joint coupling point.

In particular, the suspension system 50 may be configured to improve durability thereof by forming multiple mounting points on the suspension system in a state in which the upper end of the suspension system is coupled to the second steering member 72 of the steering system 70.

As shown in FIG. 7, the damper unit 55 may be configured such that one end of the damper unit, which can be coupled to the steering system 70, can be farther away from the other end coupled to the knuckle 56 in the height direction of the vehicle. Furthermore, a first coupling part 74 can be coupled to the damper unit 55 and may be located closer to the outer edge of the steering system 70 than a second coupling part 75 coupled to the second link 53. Therefore, the damper unit 55 may be located diagonally in the height direction of the vehicle.

One end of the damper unit 55 may be coupled to the outer surface of the knuckle 56 so as to have a rotational degree of freedom, and the other end of the damper unit 55 may be coupled to the steering system 70 including a first coupling point so as to have a rotational degree of freedom with respect to the first coupling point. Therefore, the length of the damper unit 55 may vary between the knuckle 56 and the steering system 70.

Furthermore, one end of the damper unit 55, which can be located at the steering system 70, can be coupled to the first coupling part 74 and can be located in the steering system 70, and one end of the second link 53 can be coupled to the steering system 70 and can be coupled to the second coupling part 75 located in the steering system 70. More specifically, an embodiment of the present disclosure can include a first joint 76 located through the first coupling part 74 and a second joint 77 located through the second coupling part 75. The first joint 76 and the second joint 77 can be configured to enable, through respective revolute joints, components respectively coupled to the coupling parts to be rotatable.

The first coupling part 74 and the second coupling part 75 can be located on the back surface of the steering system 70 and respectively can include the first joint 76 and the second joint 77 which can be orthogonal to each other. That is, the damper unit 55 coupled to the first coupling part 74 and the second link 53 coupled to the second coupling part 75 can be rotatably located in a perpendicular manner. Furthermore, the first coupling part 74 may be located farther from the center of the steering system 70 than the second coupling part 75, and the damper unit 55 may be coupled to the first coupling part 74 so as to have a predetermined angle in the height direction of the vehicle so as not to interfere with the second link 53.

In this way, the second link 53 can be coupled to the second coupling part 75 and the second joint 77 so as to have a rotational degree of freedom with respect to the second joint 77. One end of the damper unit 55 can be coupled to the back surface of the steering system 70 and can be coupled to the first coupling part 74 and the first joint 76 such that a rotational degree of freedom perpendicular to the second joint 77 can be applied to one end of the damper unit 55.

Figure 9A:
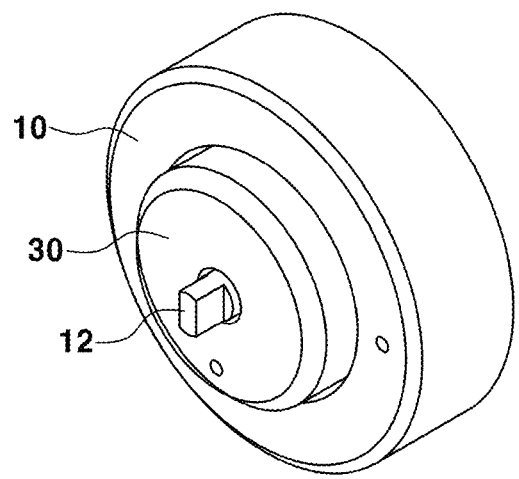
FIG. 9A is a perspective view showing a protrusion of a rotational center shaft of a wheel according to an embodiment of the present disclosure.
Figure 9B:
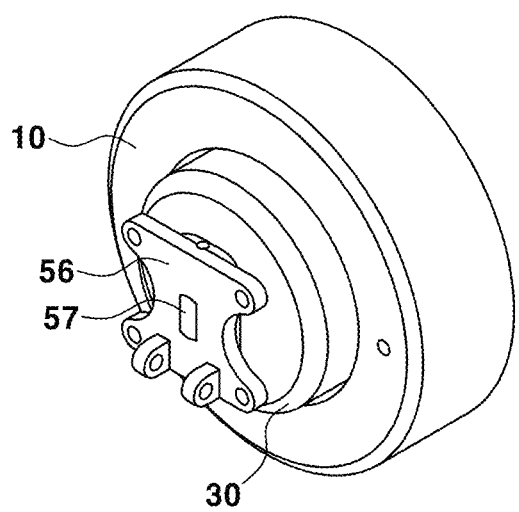
FIG. 9B is a perspective view showing a knuckle structure into which a protrusion of a rotational center shaft of a wheel according to an embodiment of the present disclosure is inserted.

FIG. 9A is a perspective view showing a protrusion of the suspension support shaft. FIG. 9B is a perspective view showing the insertion groove 57 of the knuckle 56, which can be coupled to the suspension support shaft.

As shown in the drawing, the suspension support shaft 51 can include a protrusion that penetrates the outer surface of the rim. The protrusion can be formed to have a shape in which at least two surfaces have a set, selected, or predetermined angle. The protrusion can be located on a rotational center shaft 12 of the rim.

The suspension support shaft 51 of an embodiment of the present disclosure may be fixedly installed to form the rotational center shaft 12 of the rim 11, and the rim may be rotated along the outer surface of the suspension support shaft 51. The rotor 42 may be applied such that the rim 11 and the disc 43 can be rotated around the suspension support shaft 51 (rotational center shaft 12).

The protrusion can be configured to be coupled to at least one knuckle 56 located on both sides of the rim 11. The knuckle 56 can include the insertion groove 57 formed to correspond to the protrusion of the suspension support shaft 51. At least two surfaces of the insertion groove 57 contact the protrusion of the suspension support shaft 51. Therefore, the suspension support shaft 51 and the knuckle 56 can be coupled to each other in a state in which the protrusion is inserted into the insertion groove 57.

According to an embodiment of the present disclosure, two surfaces of the protrusion may be formed to have parallel cross sections, and the insertion groove 57 may have a shape corresponding to a shape of the protrusion. The protrusion and the insertion groove 57 may be coupled to each other through a conventional method so as to couple the knuckle 56 to the suspension support shaft 51 in a state in which the protrusion is inserted into the insertion groove 57.

Figure 10A:
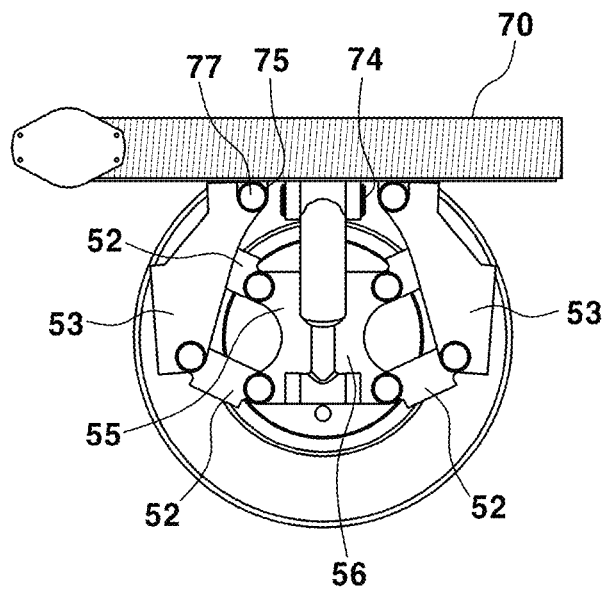
FIG. 10A is a side view showing a suspension system in a neutral state according to an embodiment of the present disclosure.

FIG. 10A is a side view of the suspension system 50 in the neutral state. The suspension system 50 can include the knuckle 56 coupled to the suspension support shaft 51, the first link 52 including two links respectively located at the upper end and the lower end of the knuckle 56, and the second link 53 coupled to at least one of the two links forming the first link 52. One end of the second link 53 can be coupled to the second coupling part 75 located on the back surface of the steering system 70 by the second joint 77, and the other end of the second link 53 can be rotatably coupled to the first link 52.

Furthermore, the first link 52 including two links may include the transmission link 54 configured to couple the two links to each other and as such, the two links coupled to the transmission link 54 may perform upward-and-downward movement in conjunction with each other with respect to the knuckle 56. The first link 52, the second link 53, and the transmission link 54 may be connected to each other using revolute joints.

The transmission link 54 can be located in the internal space of the second link 53, and the second link 53 may include a hollow space. One end of the hollow space can be open so as to allow the transmission link 54 to be located in the hollow space.

The end of the link, which is located at the lower end of the knuckle, of the two links of the first link 52 can be jointly coupled to the transmission link 54 and the second link 53. Therefore, the second link 53 may be moved in the upward-and-downward direction in conjunction with movement of the first link 52.

In the neutral state, the other end of the first link 52 can be configured to be located higher in the height direction than one end of the first link coupled to the knuckle 56. Furthermore, the second links 53 can be respectively located at the opposite ends of the knuckle 56 and can be spaced apart from each other. The other end of each of the second links 53 can be located farther away from the knuckle 56 than one end with respect to the second coupling part 75.

Figure 10B:
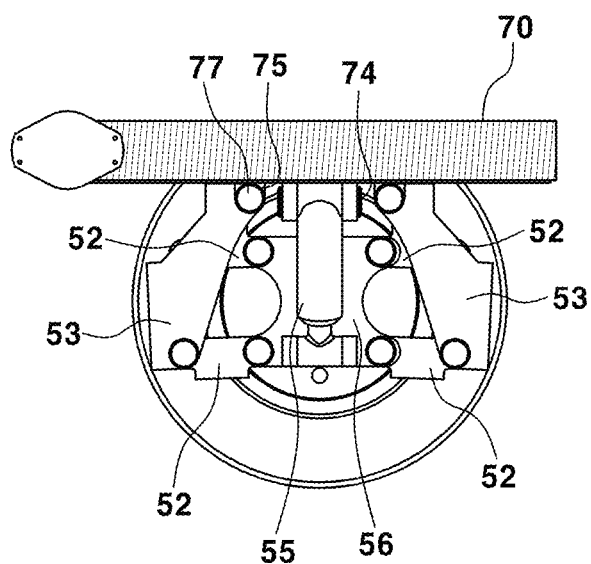
FIG. 10B is a side view showing a suspension system when a vehicle bumps according to an embodiment of the present disclosure.

Compared to the neutral state shown in FIG. 10A, FIG. 10B shows a positional relationship of the suspension system 50 when a vehicle bumps.

As compared with the above-described neutral state, when a vehicle bumps, a wheel is moved upwards in the height direction. In this state, the end of the first link 52 coupled to the knuckle 56 can be integrally moved upwards with the second link 53 in the height direction. In the first link 52, the ends of the two links forming the first link can be integrally moved in the height direction with the transmission link 54 with respect to the joints coupled to the knuckle 56. The end of the first link 52 can be rotated around the knuckle 56, and the ends of two links forming the first link 52 can be moved in a direction away from each other. When the vehicle bumps, the two links forming the first link 52, which can be located at the opposite ends of the knuckle, may become parallel to each other in the longitudinal direction of the vehicle. That is, the ends of the two links forming the first link 52, which are coupled to the knuckle, may be moved in the height direction when the vehicle bumps or rebounds.

Furthermore, when the ends of the first links 52 respectively located on the opposite sides of the knuckle 56 are moved in a direction away from each other, the ends of the second links 53 respectively coupled to the ends of the first links 52 can be also moved in a direction away from each other in conjunction with movement of the first links 52. Accordingly, the ends of the second link 53 respectively located on the opposite sides of the knuckle may be moved away from the knuckle 56. One end of the second link 53 can be coupled to the second coupling part 75 located on the back surface of the steering system 70. When the vehicle bumps, the second links 53 are rotated around the respective second joints 77 by a set, selected, or predetermined angle, and the ends of the second link 53 may be moved in a direction away from each other.

The length of the damper unit 55 can be configured to be reduced in the longitudinal direction in response to a decrease in a distance between the end of the damper unit coupled to the knuckle 56 and the first coupling part 74. Furthermore, an angle formed between one end of the damper unit 55 located at the knuckle 56 and the first coupling part 74 may be larger than an angle in the neutral state.

Figure 10C:
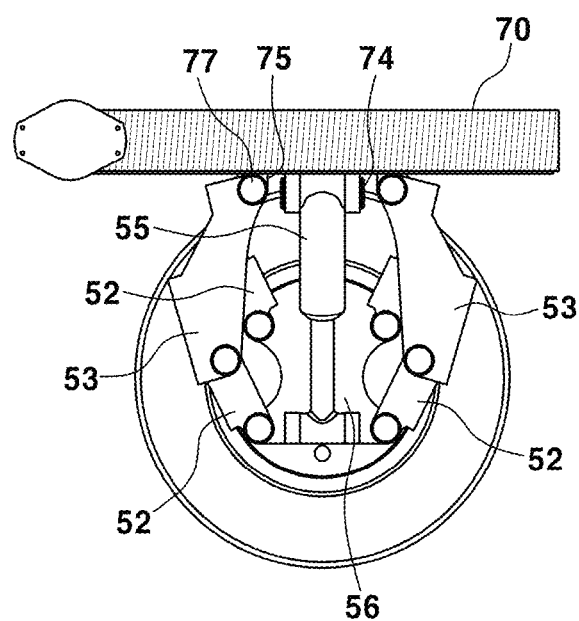
FIG. 10C is a side view showing a suspension system when a vehicle rebounds according to an embodiment of the present disclosure.

FIG. 10C is a view showing a positional relationship of the suspension system 50 when the vehicle rebounds.

As shown in the drawing, when the vehicle rebounds, the wheel is located away from the steering system 70 in the height direction. Accordingly, the first links 52 respectively located at the opposite ends of the knuckle 56 can be rotated downwards around the joints coupled to the knuckle 56, and the transmission link 54 and the second links 53 can be integrally moved in conjunction with movement of the first links 52 in the height direction.

When the vehicle rebounds, the respective lower ends of the second links 53 are moved downwards in the height direction. The respective ends of the second links 53 respectively located at the opposite sides of the knuckle 56 can be moved in a direction toward each other.

The damper unit 55 can be configured to increase the length thereof in the longitudinal direction of the damper unit 55 in response to downward movement of the knuckle 56 in the height direction. Furthermore, the angle formed between one end of the damper unit 55 located at the knuckle 56 and the first coupling part 74 may be smaller than the angle in the neutral state.

In this manner, when the vehicle rebounds, the respective other ends of the first links 52 and the second links 53 connected to the respective other ends of the first link 52 can be integrally moved downwards compared to the neutral state, and the damper unit 55 can be configured to extend in the longitudinal direction thereof.

As can be apparent from the above description, an embodiment of the present disclosure may achieve the following effects and/or advantages by the configuration, combination, and use relationship described in the example embodiments.

An embodiment of the present disclosure can provide a suspension system including a coupling structure between a plurality of links located on the side surface of a rim, thereby having an effect/advantage of securing stability in response to horizontal external force of a vehicle.

An embodiment of the present disclosure can provide a suspension system in which a plurality of links and a damper unit are connected to a knuckle, thereby providing a structure capable of being moved in the upward-and-downward direction in a state in which forward-and-rearward movement and leftward-and-rightward movement are restricted. In this manner, using an embodiment of the present disclosure, it can be possible to achieve an effect/advantage of providing a stable driving module when a vehicle bumps and rebounds.

A number of embodiments have been disclosed herein. It can be understood that various features of the different embodiments can be combined.

Although the present disclosure has been described in detail with reference to example embodiments thereof, the scopes of the present disclosure are not necessarily limited to the above-described example embodiments and the accompanying drawings thereof, and it can be appreciated by those skilled in the art that various modifications and improvements may be made in the example embodiments without departing from the principles and spirit of the disclosure. Therefore, the example embodiments should be considered illustrative rather than necessarily restrictive. Accordingly, the present disclosure is not necessarily limited to the example embodiments and may be modified within the scope of the appended claims and equivalents thereto.

What is claimed is:

1. A vehicle driving system comprising:
   a driving/braking system comprising an in-wheel motor and an electromechanical brake installed in a rim inner side of a rim of a tire;
   a suspension system coupled to a rotational center shaft of the rim; and
   a steering system provided on an upper portion of the suspension system,
   wherein the suspension system comprises:
      a knuckle connected to the rotational center shaft of the rim,
      a plurality of first links, each of the plurality of first links having one end connected to the knuckle,
      second links respectively connected to other ends of the first links and the steering system, and
      a damper unit located between the knuckle and the steering system.

2. The vehicle driving system of claim 1, wherein the steering system comprises:
   a first steering member configured to be fixed to a vehicle body; and
   a second steering member located on a first-steering-member inner side of the first steering member, the second steering member having a lower portion coupled to the suspension system.

3. The vehicle driving system of claim 2, wherein the suspension system is configured so that each of the second links contacts the second steering member when a vehicle bumps and functions as a stopper.

4. The vehicle driving system of claim 2, wherein the damper unit has one end connected to the knuckle and another end connected to the second steering member.

5. The vehicle driving system of claim 4, wherein the one end of the damper unit connected to the knuckle is connected to a lower end of the knuckle, the lower end being located below the rotational center shaft.

6. The vehicle driving system of claim 1, wherein the first links are symmetrically connected to a left end and a right end of the knuckle.

7. The vehicle driving system of claim 6, further comprising transmission links, each of the transmission links being disposed to connect the other ends of the first links respectively connected to the left end and the right end of the knuckle.

8. The vehicle driving system of claim 7, wherein the transmission links respectively located at the left end and the right end of the knuckle are provided parallel to each other.

9. The vehicle driving system of claim 7, wherein each of the first links has one end connected to a lowermost end of a corresponding one of the left end and the right end of the knuckle, and each of the first links has the other end connected to a corresponding one of the transmission links and a corresponding one of the second links.

10. The vehicle driving system of claim 9, wherein the suspension system is configured so that a distance between lower ends of the second links respectively located on a left side and a right side of the knuckle varies when a vehicle bumps or rebounds.

11. The vehicle driving system of claim 9, wherein each of the first links, each of the second links, and each of the transmission links are connected to each other using a corresponding one of revolute joints.

12. The vehicle driving system of claim 9, wherein each of the second links has a space for accommodating a corresponding one of the transmission links to be located therein.

13. The vehicle driving system of claim 1, wherein each of the first links has the one end connected to the knuckle and configured to be movable in a height direction when a vehicle bumps or rebounds.

14. The vehicle driving system of claim 1, wherein the rotational center shaft protrudes from an outer surface of the rim so as to be inserted into an insertion groove formed in the knuckle.

15. The vehicle driving system of claim 2, wherein the steering system further comprises a steering driving unit configured to rotatably drive the second steering member.

16. The vehicle driving system of claim 15, wherein the second steering member and the steering driving unit are coupled to each other through a worm wheel structure.

\* \* \* \* \*